Patented Jan. 17, 1933

1,894,755

UNITED STATES PATENT OFFICE

ARTHUR TREGONING CAPE AND KIEL B. BOWMAN, OF MASSILLON, OHIO, ASSIGNORS, BY MESNE ASSIGNMENTS, TO REPUBLIC STEEL CORPORATION, OF YOUNGSTOWN, OHIO, A CORPORATION OF NEW JERSEY

PRESERVATION OF METALLURGICAL FURNACE BOTTOMS

No Drawing. Application filed December 30, 1930. Serial No. 505,582. REISSUED

This invention relates to the preservation of the bottoms of metallurgical furnaces, such as are commonly employed in the manufacture of steel and alloys thereof.

In the manufacture of steel and alloys thereof in open hearth and electric furnaces, slags are formed, which, if not removed prior to tapping of the heat from the furnace, settle to the bottom of the furnace, coat and seep into the bottom material, which may be magnesite, and penetrate cracks that may be present therein. Upon solidification and subsequent cooling of the slag, a phenomenon occurs, the exact nature of which is not known, but which is apparently an inversion from one molecular form to another. This inversion is usually accompanied by a dilatation or expansion, which in turn causes an expansion and resultant disintegration of the furnace bottom to a depth of several inches. When this takes place, the disintegrated portion of the bottom must be removed and replaced by new bottom material.

Even when disintegration of the bottom occurs to only a slight degree, a charge of cold scrap placed on the bottom for the succeeding heat, will cause additional disintegration, owing to the chilling effect of the scrap on the entrapped slag.

The presence of reducible oxides in the slag, such as those of iron, manganese and phosphorus, would tend to prevent inversion of the slag on solidification and subsequent cooling, but in electric furnaces, there is usually a deficiency of such oxides.

As the result of a series of experiments, we have discovered that the inversion and dilatation of the slag on solidification and subsequent cooling, and consequent disintegration of the furnace bottom may be entirely prevented and the furnace bottom maintained substantially intact by the addition to the slag of a borate in relatively small quantities, i. e., from about .5% to about 5% by weight of the slag, from about 1% to about 2% being preferably employed. While any borate may be satisfactorily employed, borax is preferably used, and in the form known as "borax glass," that is to say, borax from which the water of crystallization has been removed.

The borax glass is preferably added to the slag immediately prior to tapping of the heat, sufficient time being allowed before tapping, to permit uniform distribution of the borax glass in the slag.

The borax glass may also be added to the slag after the heat has been tapped, in which case it must be added to the slag before the latter has solidified.

If desired, the borax glass may be incorporated with the material of the furnace bottom, or may even be sprinkled over the furnace bottom prior to placing the charge thereon.

While borates have been found to be eminently satisfactory for the purpose of stabilizing and preventing inversion of the slag on solidification and subsequent cooling, phosphates may also be employed for this purpose. Their use in electric furnaces is, however, not desirable, because they are usually reduced under the conditions prevailing at the end of a heat.

Salts of sodium, other than borax, such as sodium chloride and sodium carbonate, have also been employed with satisfactory results, but quantities excessively large for electric furnace use must be employed.

We claim:

1. The method of preserving metallurgical furnace bottoms which are normally subject to disintegration by the expansion of slag which seeps therein and expands on solidification and subsequent cooling, consisting in incorporating a borate with the slag before the latter solidifies.

2. The method of preserving metallurgical furnace bottoms which are normally subject to disintegration by the expansion of slag which seeps therein and expands on solidification and subsequent cooling, consisting in incorporating borax glass with the slag before the latter solidifies.

3. The method of preserving metallurgical furnace bottoms which are normally subject to disintegration by the expansion of slag which seeps therein and expands on solidification and subsequent cooling, consisting in incorporating a borate in amounts of about .5% to about 5% with the slag before the latter solidifies.

4. The method of preserving metallurgical furnace bottoms which are normally subject to disintegration by the expansion of slag which seeps therein and expands on solidification and subsequent cooling, consisting in incorporating borax glass in amounts of about .5% to about 5% with the slag before the latter solidifies.

5. The method of preserving metallurgical furnace bottoms which are normally subject to disintegration by the expansion of slag which seeps therein and expands on solidification and subsequent cooling, consisting in incorporating a borate in amounts of about 1% to about 2% with the slag before the latter solidifies.

6. The method of preserving metallurgical furnace bottoms which are normally subject to disintegration by the expansion of slag which seeps therein and expands on solidification and subsequent cooling, consisting in incorporating borax glass in amounts of about 1% to about 2% with the slag before the latter solidifies.

In testimony whereof we affix our signatures.

ARTHUR TREGONING CAPE.
KIEL B. BOWMAN.